Patented May 25, 1937

2,081,279

UNITED STATES PATENT OFFICE 2,081,279

DEPILATORY

Albert B. Pacini, Chicago, Ill., assignor to Neet, Incorporated, Chicago, Ill., a corporation of New Jersey No Drawing. Application March 17, 1934, Serial No. 716,105

5 Claims. (Cl. 167—89)

The present application relates to depilatories, and more in particular to depilatories suitable for application to the human body for removal of hair.

An object of the present invention is to provide a novel depilatory compound which is odorless, non-poisonous, and non-oxidizable under all conditions, and which may be suitably buffed so as to be non-irritating to the skin. Such an odorless compound can be applied to the human body without affecting the skin or system in any way and can remain upon display or shelves an indefinite length of time without deteriorating.

The present invention comprehends the idea of forming a depilatory compound including a salt in which the acid forming element exists in its highest state of valence whereby the compound is not oxidized, and which yields an alkaline end product on hydrolysis in a rapid reversible system.

The present invention also has as an object the idea of producing a suitable depilatory which can be applied to the human body which includes alkali or alkaline earth salts in which the acid forming element exists in its highest state of valence in order that the compound cannot be oxidized, and which yields an alkaline end product on hydrolysis in a rapid reversible system.

Another object of the present invention is to provide a suitable depilatory compound which may be applied to the human body and which includes a salt of the alkali or alkaline earth metals with the oxygen acid of tetravalent titanium.

Various salts have been used successfully as a suitable depilatory for the removal of hair from the human body without injuring the skin, and in each instance produce, upon hydrolysis, end products having suitable hydroxyl ion concentration which may, if necessary, be controlled by suitable buffering agents. As an example, it has been found that sodium, potassium and calcium titanate can be successfully used as a depilatory. The sodium titanate, for example, can be prepared by dissolving 80 parts by weight of sodium hydroxide in a small quantity of water and mixed into a paste with 80 parts of titanium oxide. The materials are then intimately mixed together, dried and heated to about 700° C., proper care being taken to expose all of the parts of the mass to the same temperature as far as possible. The resulting mixture is cooled and powdered and mixed into a paste with approximately 30 parts by weight of water. To this solution suitable buffers may be used, if necessary, to adjust the static pH concentration of the hydroxyl ions. Materials such as bentonite or such special clay substances, or organic buffering materials such as casein, albumen and the like may be used, which at the same time serve to preserve the depilatory action. The resulting depilatory is in the form of a paste with water which provides a compound which is easy to apply and in which the chemical characteristics of the ingredients are substantially under control. Thus, the active depilatory agent is in saturated solution, the hydrolysis is at a minimum and the pH concentration at a maximum.

As above indicated, potassium or calcium titanate may be used, if desired, as a suitable depilatory compound. In the case of potassium titanate, the same is formed by mixing 112 parts by weight of potassium hydroxide with 80 parts by weight of titanium oxide, heating the materials together as indicated, and mixing the resulting product with about 100 parts by weight of water, to which suitable buffers may be added if found necessary in order to get the required static concentration of the hydroxyl ions.

Non-oxidizable depilatory compounds which are odorless and non-poisonous, and which can be used with a suitable buffer to reduce the pH concentration and to prevent irritation to the skin when applied to the human body may comprise the double alkali and/or alkaline earth metal titanates. An example of the double salts having the double basic radical is calcium sodium titanate,

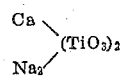

In the example given, the titanate may comprise the basic forming elements which may in both instances be the alkali metals or alkaline earth metals, or one of which may be alkali metal and the other of which may be the alkaline earth metal.

Depilatories made in accordance with the above disclosure are all non-oxidizable inasmuch as the acid forming element, namely titanium, is in its highest state of valence. Furthermore these depilatories are odorless, non-poisonous and may be suitably buffed whereby the same are substantially non-irritating when applied to the skin, and upon hydrolysis provide an alkaline end product in a reversible system having an effective alkalinity sufficient to attack the keratin molecule. These depilatory compounds are therefore particularly adapted for use in removing hair from the human body without ill effects, are pleasant to use, and quickly and readily remove the hair.

I claim:

1. A depilatory compound comprising a salt in which the base forming part thereof includes at least one element of the alkali and alkaline earth metal groups and having an oxygen acid forming part which includes tetra-valent titanium and yielding an alkaline end product on hydrolysis.

2. A depilatory compound comprising a salt in which the base forming part thereof includes potassium and having an oxygen acid forming part which includes tetra-valent titanium and yielding an alkaline end product on hydrolysis.

3. A depilatory compound comprising a salt in which the base forming part thereof includes sodium and having an oxygen acid forming part which includes tetra-valent titanium and yielding an alkaline end product on hydrolysis.

4. A depilatory compound comprising a salt in which the base forming part thereof includes calcium and having an oxygen acid forming part which includes tetra-valent titanium and yielding an alkaline end product on hydrolysis.

5. A depilatory compound comprising a salt in which the base forming part includes at least one element of the alkali metal group and at least one element of the alkaline earth metal group and having an oxygen acid forming part which includes tetra-valent titanium and yielding an alkaline end product on hydrolysis.

ALBERT B. PACINI.